US011628815B2

(12) United States Patent
Li (10) Patent No.: US 11,628,815 B2
(45) Date of Patent: Apr. 18, 2023

(54) STROKE SIMULATOR (71) Applicant: ADVICS CO., LTD., Kariya (JP)

(72) Inventor: Hongding Li, Kariya (JP)

(73) Assignee: ADVICS CO., LTD., Kariya (JP)

( * ) Notice: Subject to any disclaimer, the term of this patent is extended or adjusted under 35 U.S.C. 154(b) by 400 days.

(21) Appl. No.: 16/766,988

(22) PCT Filed: Dec. 4, 2018

(86) PCT No.: PCT/JP2018/044557
§ 371 (c)(1),
(2) Date: May 26, 2020

(87) PCT Pub. No.: WO2019/111894
PCT Pub. Date: Jun. 13, 2019

(65) Prior Publication Data
US 2020/0324749 A1 Oct. 15, 2020

(30) Foreign Application Priority Data
Dec. 6, 2017 (JP) .............................. JP2017-234362

(51) Int. Cl.
B60T 8/40 (2006.01)
B60T 13/14 (2006.01)
B60T 13/68 (2006.01)

(52) U.S. Cl.
CPC ............ B60T 8/409 (2013.01); B60T 13/146 (2013.01); B60T 13/686 (2013.01); B60T 2270/10 (2013.01); B60T 2270/82 (2013.01)

(58) Field of Classification Search
CPC ...... B60T 8/409; B60T 13/686; B60T 8/4081; B60T 8/4086; B60T 13/146; B60T 2270/10; B60T 2270/82
See application file for complete search history.

(56) References Cited

U.S. PATENT DOCUMENTS 7,331,641 B2 * 2/2008 Kusano .................. B60T 13/74
303/114.1
9,141,129 B2 * 9/2015 Kim ........................ G05G 5/03
(Continued)

FOREIGN PATENT DOCUMENTS

CN 103818361 A 5/2014
JP S40-028082 Y1 9/1965
(Continued)

OTHER PUBLICATIONS

International Search Report (PCT/ISA/210) dated Mar. 12, 2019, by the Japan Patent Office as the International Searching Authority for International Application No. PCT/JP2018/044557.
(Continued)

Primary Examiner — Pamela Rodriguez
(74) Attorney, Agent, or Firm — Buchanan Ingersoll & Rooney PC (57) ABSTRACT The present invention comprises: a piston provided in a cylinder hole; a lid member which closes an opening on the other side of the cylinder hole; and elastic members and which are provided between the piston and the lid member. The elastic members and comprise a first elastic member provided on the piston side of the cylinder hole, and a second elastic member provided on the lid member side of the cylinder hole. The second elastic member has a base portion provided in line with the first elastic member, and a protruding portion protruding from the piston side end surface of the base portion. When the piston has moved in the axial direction to the lid member side, the protruding portion touches the piston, undergoing compressive deformation, and the base portion subsequently undergoes compressive deformation.

5 Claims, 5 Drawing Sheets (56) References Cited

U.S. PATENT DOCUMENTS

| | | | |
|---|---|---|---|
| 2002/0140286 A1* | 10/2002 | Ishimura | B60T 7/042 |
| | | | 303/155 |
| 2004/0181381 A1* | 9/2004 | Matsuhashi | B60T 8/4081 |
| | | | 703/7 |
| 2012/0103452 A1* | 5/2012 | Toyohira | B60T 8/4081 |
| | | | 138/31 |
| 2014/0000254 A1 | 1/2014 | Murayama et al. | |
| 2014/0069093 A1* | 3/2014 | Kim | B60T 8/409 |
| | | | 60/553 |
| 2014/0138888 A1 | 5/2014 | Kim | |
| 2014/0360177 A1* | 12/2014 | Ryu | B60T 8/409 |
| | | | 60/556 |

FOREIGN PATENT DOCUMENTS

| | | |
|---|---|---|
| JP | 2004161074 A | 6/2004 |
| JP | 2012206711 A | 10/2012 |

OTHER PUBLICATIONS

Written Opinion (PCT/ISA/237) dated Mar. 12, 2019, by the Japan Patent Office as the International Searching Authority for International Application No. PCT/JP2018/044557.

* cited by examiner

ONE END SIDE ←→ OTHER END SIDE

STROKE SIMULATOR

TECHNICAL FIELD

The present invention relates to a stroke simulator.

BACKGROUND ART

Some vehicle braking devices include a stroke simulator that applies a reaction force to a brake operation member. For example, Japanese Unexamined Patent Publication No. 2012-206711 describes a stroke simulator including first to third elastic members having different elastic coefficients in a cylinder. In this stroke simulator, a linear reaction force characteristic of the first elastic member at the initial stage of input (initial stage of brake operation) and a linear reaction force characteristic of the second elastic member at the later stage of input are connected with a non-linear reaction characteristic of the third elastic member at the middle stage of input to alleviate the sense of discomfort at the time of brake operation.

CITATIONS LIST

Patent Literature

Patent Literature 1: Japanese Unexamined Patent Publication No. 2012-206711

SUMMARY OF INVENTION

Technical Problems

However, in the stroke simulator described above, three elastic members are provided in the cylinder, and hence the number of components increases, and there is a concern that the assembly property may lower and the cost may increase. Furthermore, if a metal spring is used as the elastic member, there is a concern that the weight of the stroke simulator increases and the size of the stroke simulator increases in the axial direction.

The present invention has been contrived in view of such circumstances, and an object of the present invention is to provide a stroke simulator that can reduce the number of components without impairing the brake feeling.

Solutions to Problems

A stroke simulator according to the present invention relates to a stroke simulator for applying a reaction force to a brake operation member, the stroke simulator including a tubular cylinder formed with a cylinder hole connected at one end side to a flow path connected to a pressurizing unit that generates fluid pressure in accordance with an operation of the brake operation member; a piston disposed in the cylinder hole; a lid member that closes an opening on the other end side of the cylinder hole; and an elastic member disposed between the piston and the lid member; where the elastic member includes a first elastic member disposed on the piston side of the cylinder hole, and a second elastic member disposed on the lid member side of the cylinder hole; and the second elastic member includes a base portion arranged in series with the first elastic member, and a protruding portion protruding out from an end face of the base portion on the piston side, and is configured such that, when the piston moves in an axial direction toward the lid member side, the base portion compresses and deforms after the protruding portion abuts against the piston and is compressed and deformed.

Advantageous Effects of Invention

According to the present invention, a reaction force characteristic at the initial stage of input (initial stage of brake operation) is realized by a first elastic member, a reaction force characteristic at a later stage of input is realized by a base portion of a second elastic member, and a reaction force characteristic at a middle stage of input connecting the initial stage of input and the later stage of input is realized by a protruding portion of the second elastic member. Thus, a brake feeling with reduced sense of discomfort can be realized by the two elastic members. That is, according to the present invention, the number of components can be reduced without impairing the brake feeling.

DESCRIPTION OF EMBODIMENTS

Hereinafter, embodiments of the present invention will be described based on the drawings. Each figure used for the description is a conceptual view, and the shape of each portion is not necessarily exact in some cases.

First Embodiment

Figure 1:
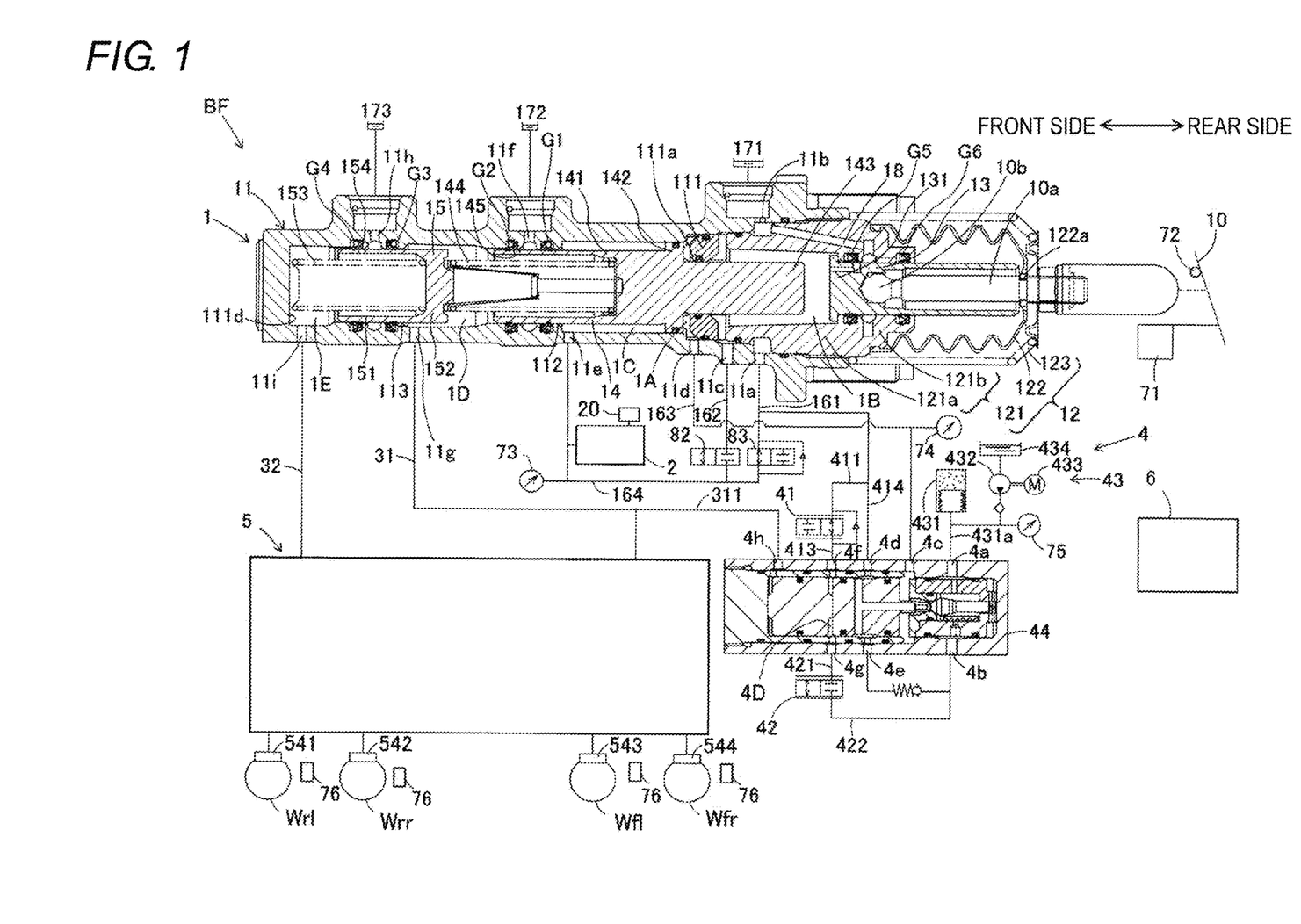
FIG. 1 is a configuration view of a vehicle braking device according to a first embodiment.

As shown in FIG. 1, a vehicle braking device BF includes a master cylinder 1, a stroke simulator 2, a first control valve 82, a second control valve 83, a servo pressure generating device 4, an actuator 5, wheel cylinders 541 to 544, a brake ECU 6, and various sensors 71 to 76.

The master cylinder 1 is a part that supplies brake fluid to the actuator 5 in accordance with the operation amount of a brake pedal (corresponding to "brake operation member") 10, and includes a main cylinder 11, a cover cylinder 12, an input piston 13, a first master piston 14 and a second master piston 15. The brake pedal 10 merely needs to be a brake operating means that is brake operable by a driver.

The main cylinder 11 is a bottomed, substantially cylindrical housing that is closed on the front side and opened on the rear side. An inner wall portion 111 that projects out in an inward flange shape is provided closer to the rear side on the inner peripheral side of the main cylinder 11. The center of the inner wall portion 111 is a through hole 111a penetrating in the front and rear direction. Furthermore, on the front side of the inner wall portion 111 inside the main cylinder 11, smaller-diameter parts 112 (rear side) and 113 (front side), which inner diameters are slightly smaller, are provided. That is, the smaller-diameter parts 112 and 113 project out in an inward annular shape from the inner peripheral surface of the main cylinder 11. The first master piston 14 is disposed inside the main cylinder 11 to slidably contact the smaller-diameter part 112 and to be movable in the axial direction. Similarly, the second master piston 15 is disposed to slidably contact the smaller-diameter part 113 and to be movable in the axial direction.

The cover cylinder 12 is configured by a substantially cylindrical cylinder portion 121, a bellows tubular boot 122, and a cup-shaped compression spring 123. The cylinder portion 121 is disposed on the rear end side of the main cylinder 11 and coaxially fitted to an opening on the rear side of the main cylinder 11. The inner diameter of a front part 121a of the cylinder portion 121 is larger than the inner diameter of the through hole 111a of the inner wall portion 111. Furthermore, the inner diameter of a rear part 121b of the cylinder portion 121 is smaller than the inner diameter of the front part 121a.

A dustproof boot 122 has a bellows tubular shape and can be expanded and contracted in the front and rear direction, and is assembled to contact the rear end side opening of the cylinder portion 121 with the front side thereof. A through hole 122a is formed at the center of the rear side of the boot 122. The compression spring 123 is a coil-shaped biasing member disposed around the boot 122, where the front side abuts to the rear end of the main cylinder 11, and the rear side is diameter reduced to be proximate to the through hole 122a of the boot 122. The rear end of the boot 122 and the rear end of the compression spring 123 are coupled to an operation rod 10a. The compression spring 123 biases the operation rod 10a toward the rear side.

The input piston 13 is a piston that slidably moves within the cover cylinder 12 according to the operation of the brake pedal 10. The input piston 13 is a bottomed substantially cylindrical piston having a bottom surface on the front side and an opening on the rear side. A bottom wall 131 forming the bottom surface of the input piston 13 has a larger diameter than other parts of the input piston 13. The input piston 13 is disposed to be axially slidable and liquid tightly on the rear part 121b of the cylinder portion 121, and the bottom wall 131 is entered to the inner peripheral side of the front part 121a of the cylinder portion 121.

The operation rod 10a that cooperatively operates with the brake pedal 10 is disposed inside the input piston 13. A pivot 10b at the distal end of the operation rod 10a can push the input piston 13 forward. The rear end of the operation rod 10a projects out to the outside through the opening on the rear side of the input piston 13 and the through hole 122a of the boot 122 and is connected to the brake pedal 10. When the brake pedal 10 is depressed, the operation rod 10a moves forward while pushing the boot 122 and the compression spring 123 in the axial direction. The input piston 13 also moves forward in cooperation with the forward movement of the operation rod 10a.

The first master piston 14 is disposed to be axially slidable on the inner wall portion 111 of the main cylinder 11. The first master piston 14 is integrally formed with a pressurizing tube portion 141, a flange portion 142, and a projecting portion 143 in order from the front side. The pressurizing tube portion 141 is formed to a bottomed substantially cylindrical shape having an opening on the front side, has a gap formed with the inner peripheral surface of the main cylinder 11, and is in sliding contact with the smaller-diameter part 112. A coil spring-shaped biasing member 144 is disposed in between the second master piston 15 in an internal space of the pressurizing tube portion 141. The first master piston 14 is biased toward the rear side by the biasing member 144. In other words, the first master piston 14 is biased by the biasing member 144 toward a set initial position.

The flange portion 142 has a larger diameter than the pressurizing tube portion 141 and is in sliding contact with the inner peripheral surface of the main cylinder 11. The projecting portion 143 has a smaller diameter than the flange portion 142 and is disposed to slidably move, in a liquid tight manner, into the through hole 111a of the inner wall portion 111. The rear end of the projecting portion 143 passes through the through hole 111a and projects out into the internal space of the cylinder portion 121, and is separated from the inner peripheral surface of the cylinder portion 121. A rear end face of the projecting portion 143 is configured to be spaced apart from the bottom wall 131 of the input piston 13 so that its separation distance can be changed.

Here, a "first master chamber 1D" is defined by the inner peripheral surface of the main cylinder 11, the front side of the pressurizing tube portion 141 of the first master piston 14, and the rear side of the second master piston 15. Furthermore, a rear chamber on the rear side of the first master chamber 1D is defined by the inner peripheral surface (inner peripheral portion) of the main cylinder 11, the smaller-diameter part 112, the front surface of the inner wall portion 111, and the outer peripheral surface of the first master piston 14. The front end and the rear end of the flange portion 142 of the first master piston 14 divide the rear chamber to the front and the rear, where a "second fluid pressure chamber 1C" is defined on the front side, and a "servo chamber 1A" is defined on the rear side. The volume of the second fluid pressure chamber 1C decreases as the first master piston 14 moves forward, and the volume increases as the first master piston 14 moves rearward. Furthermore, a "first fluid pressure chamber 1B" is defined by the inner peripheral portion of the main cylinder 11, the rear surface of the inner wall portion 111, the inner peripheral surface (inner peripheral portion) of the front part 121a of the cylinder portion 121, the projecting portion 143 (rear end) of the first master piston 14, and the front end of the input piston 13.

The second master piston 15 is disposed on the front side of the first master piston 14 in the main cylinder 11 to slidably contact the smaller-diameter part 113 and to be movable in the axial direction. The second master piston 15 is integrally formed with a tubular pressurizing tube portion 151 having an opening on the front side, and a bottom wall 152 that closes the rear side of the pressurizing tube portion 151. The bottom wall 152 journals the biasing member 144 between itself and the first master piston 14. A coil-shaped biasing member 153 is disposed in the internal space of the pressurizing tube portion 151 in between the closed inner bottom surface 111d of the main cylinder 11. The second master piston 15 is biased toward the rear side by the biasing member 153. In other words, the second master piston 15 is biased by the biasing member 153 toward a set initial position. A "second master chamber 1E" is defined by the inner peripheral surface of the main cylinder 11, the inner bottom surface 111d, and the second master piston 15.

The master cylinder 1 is formed with ports 11a to 11i that communicate the inside with the outside. The port 11a is formed on the rear side of the inner wall portion 111 of the main cylinder 11. The port 11b is formed facing the port 11a at a similar position in the axial direction as the port 11a. The port 11a and the port 11b communicate through an annular space between the inner peripheral surface of the main cylinder 11 and the outer peripheral surface of the cylinder portion 121. The port 11a and the port 11b are connected to a pipe 161 and connected to a reservoir 171 (low pressure source).

The port 11b is in communication with the first fluid pressure chamber 1B by a passage 18 formed in the cylinder portion 121 and the input piston 13. The passage 18 is shut off when the input piston 13 moves forward, so that the first fluid pressure chamber 1B and the reservoir 171 are shut off. The port 11c is formed on the rear side of the inner wall portion 111 and on the front side of the port 11a, and communicates the first fluid pressure chamber 1B and a pipe 162. The port 11d is formed on the front side of the port 11c, and communicates the servo chamber 1A and a pipe 163. The port 11e is formed on the front side of the port 11d, and communicates the second fluid pressure chamber 1C and a pipe 164.

The port 11f is formed between seal members G1 and G2 of the smaller-diameter part 112, and communicates the reservoir 172 and the inside of the main cylinder 11. The port 11f is in communication with the first master chamber 1D through a passage 145 formed in the first master piston 14. The passage 145 is formed at a position where the port 11f and the first master chamber 1D are shut off when the first master piston 14 moves forward. The port 11g is formed on the front side of the port 11f, and communicates the first master chamber 1D and a duct 31.

The port 11h is formed between seal members G3 and G4 of the smaller-diameter part 113, and communicates the reservoir 173 and the inside of the main cylinder 11. The port 11h is in communication with the second master chamber 1E through a passage 154 formed in the pressurizing tube portion 151 of the second master piston 15. The passage 154 is formed at a position where the port 11h and the second master chamber 1E are shut off when the second master piston 15 moves forward. The port 11i is formed on the front side of the port 11h, and communicates the second master chamber 1E and a duct 32.

Furthermore, in the master cylinder 1, a seal member such as an O-ring is appropriately disposed. The seal members G1 and G2 are disposed in the smaller-diameter part 112 and are liquid tightly abutted to the outer peripheral surface of the first master piston 14. Similarly, the seal members G3 and G4 are disposed in the smaller-diameter part 113 and are liquid tightly abutted to the outer peripheral surface of the second master piston 15. Furthermore, seal members G5 and G6 are also disposed between the input piston 13 and the cylinder portion 121.

The stroke sensor 71 is a sensor that detects a stroke (operation amount) of the brake pedal 10 by the driver's operation, and transmits a detection signal to the brake ECU 6. A brake switch 72 is a switch for detecting the presence or absence of the operation of the brake pedal 10 by the driver as a binary signal, and transmits a detection signal to the brake ECU 6. The brake switch 72 is also called a brake stop switch.

The stroke simulator 2 is a device that generates a reaction force opposing the operation force when the brake pedal 10 is operated. In other words, the stroke simulator 2 is a device that applies a reaction force to the brake pedal 10. The stroke simulator 2 generates a reaction force fluid pressure in the first fluid pressure chamber 1B and the second fluid pressure chamber 1C in accordance with the operation of the brake pedal 10. The configuration of the stroke simulator 2 will be described later.

The first control valve 82 is an electromagnetic valve having a structure of being closed in a non-energized state, and the opening and closing of the first control valve 82 are controlled by the brake ECU 6. The first control valve 82 is connected between the pipe 164 and the pipe 162. Here, the pipe 164 is communicated to the second fluid pressure chamber 1C through the port 11e, and the pipe 162 is communicated to the first fluid pressure chamber 1B through the port 11c. When the first control valve 82 is opened, the first fluid pressure chamber 1B is in an opened state, and when the first control valve 82 is closed, the first fluid pressure chamber 1B is in a sealed state. Therefore, the pipe 164 and the pipe 162 are provided to communicate the first fluid pressure chamber 1B and the second fluid pressure chamber 1C.

The first control valve 82 is closed in a non-energized state in which current is not flowed, and at this time, the first fluid pressure chamber 1B and the second fluid pressure chamber 1C are shut off. As a result, the first fluid pressure chamber 1B is sealed and there is no place for the brake fluid to move, and the input piston 13 and the first master piston 14 move in cooperation with each other while maintaining a constant separation distance. Furthermore, the first control valve 82 is opened in the energized state in which current is flowed, and at this time, the first fluid pressure chamber 1B and the second fluid pressure chamber 1C are communicated. As a result, the change in volume of the first fluid pressure chamber 1B and the second fluid pressure chamber 1C involved in the forward and rearward movement of the first master piston 14 is absorbed by the movement of the brake fluid.

A pressure sensor 73 is a sensor that detects the reaction force pressure of the second fluid pressure chamber 1C and the first fluid pressure chamber 1B, and is connected to the pipe 164. The pressure sensor 73 detects the pressure in the second fluid pressure chamber 1C when the first control valve 82 is in a closed state, and also detects the pressure in the communicated first fluid pressure chamber 1B when the first control valve 82 is in an opened state. The pressure sensor 73 transmits the detection signal to the brake ECU 6.

The second control valve 83 is an electromagnetic valve having a structure of being opened in a non-energized state, and the opening and closing of the second control valve 83 are controlled by the brake ECU 6. The second control valve 83 is connected between the pipe 164 and the pipe 161. Here, the pipe 164 is communicated with the second fluid pressure chamber 1C through the port 11e, and the pipe 161 is communicated with the reservoir 171 through the port 11a. Therefore, the second control valve 83 communicates the second fluid pressure chamber 1C and the reservoir 171 in the non-energized state so as not to generate the reaction force pressure, and shuts off the second fluid pressure chamber and the reservoir in the energized state so as to generate the reaction force pressure.

The servo pressure generating device 4 is a so-called hydraulic booster (booster device), and includes a pressure-decreasing valve 41, a pressure-increasing valve 42, a pressure supplying unit 43, and a regulator 44. The pressure-decreasing valve 41 is a normally-open electromagnetic valve (normally-open valve) that opens in a non-energized state, and the flow rate (or pressure) thereof is controlled by the brake ECU 6. One side of the pressure-decreasing valve 41 is connected to the pipe 161 through a pipe 411, and the other side of the pressure-decreasing valve 41 is connected to a pipe 413. That is, one side of the pressure-decreasing valve 41 is in communication with the reservoir 171 through the pipes 411 and 161 and the ports 11a and 11b. The brake fluid is prevented from flowing out of a pilot chamber 4D by closing the pressure-decreasing valve 41. The reservoir 171 and the reservoir 434 communicate with each other, although not shown. The reservoir 171 and the reservoir 434 may be the same reservoir.

The pressure-increasing valve 42 is a normally-closed electromagnetic valve (normally-closed valve) that closes in a non-energized state, and the flow rate (or pressure) thereof is controlled by the brake ECU 6. One side of the pressure-increasing valve 42 is connected to a pipe 421, and the other side of the pressure-increasing valve 42 is connected to a pipe 422. The pressure supplying unit 43 is a part that mainly supplies a high-pressure operation fluid to the regulator 44. The pressure supplying unit 43 includes an accumulator 431, a fluid pressure pump 432, a motor 433, and a reservoir 434. The pressure sensor 75 detects the fluid pressure of the accumulator 431. Since the configuration of the pressure supplying unit 43 is known, the description thereof will be omitted.

The regulator 44 is a mechanical regulator and has a pilot chamber 4D formed therein. The regulator 44 has a plurality of ports 4a to 4h. The pilot chamber 4D is connected to the pressure-decreasing valve 41 through the port 4f and the pipe 413, and is connected to the pressure-increasing valve 42 through the port 4g and the pipe 421. With the opening of the pressure-increasing valve 42, high-pressure brake fluid is supplied from the accumulator 431 to the pilot chamber 4D through the ports 4a, 4b, and 4g, the piston is moved, and the pilot chamber 4D is enlarged. The valve member moves according to the enlargement, whereby the port 4a communicates with the port 4c, and high-pressure brake fluid is supplied to the servo chamber 1A through the pipe 163. On the other hand, with the opening of the pressure-decreasing valve 41, the fluid pressure (pilot pressure) of the pilot chamber 4D decreases, and the flow path between the port 4a and the port 4c is shut off by the valve member. Thus, the brake ECU 6 controls the pilot pressure corresponding to the servo pressure and thus controls the servo pressure by controlling the pressure-decreasing valve 41 and the pressure-increasing valve 42. The actual servo pressure is detected by the pressure sensor 74. The first embodiment has a by-wire configuration in which a brake operation mechanism and a pressure adjustment mechanism are separated.

The actuator 5 is a device that adjusts the master pressure supplied through the ducts 31 and 32 and supplies the adjusted master pressure to the wheel cylinders 541 to 544. The actuator 5 is an actuator that forms the ABS, and includes a plurality of electromagnetic valves, a motor, a pump, a reservoir, and the like (not shown). The actuator 5 can execute the pressure increasing control, the holding control, and the pressure decreasing control with respect to the wheel cylinders 541 to 544 under the control of the brake ECU 6. Furthermore, the actuator 5 can execute anti-skid control (ABS control) or the like under the control of the brake ECU 6. Each wheel W is provided with a wheel speed sensor 76. The brake ECU 6 is an electronic control unit including a CPU and a memory, and controls each electromagnetic valve and the like.

(Structure of Stroke Simulator)

Figure 2:
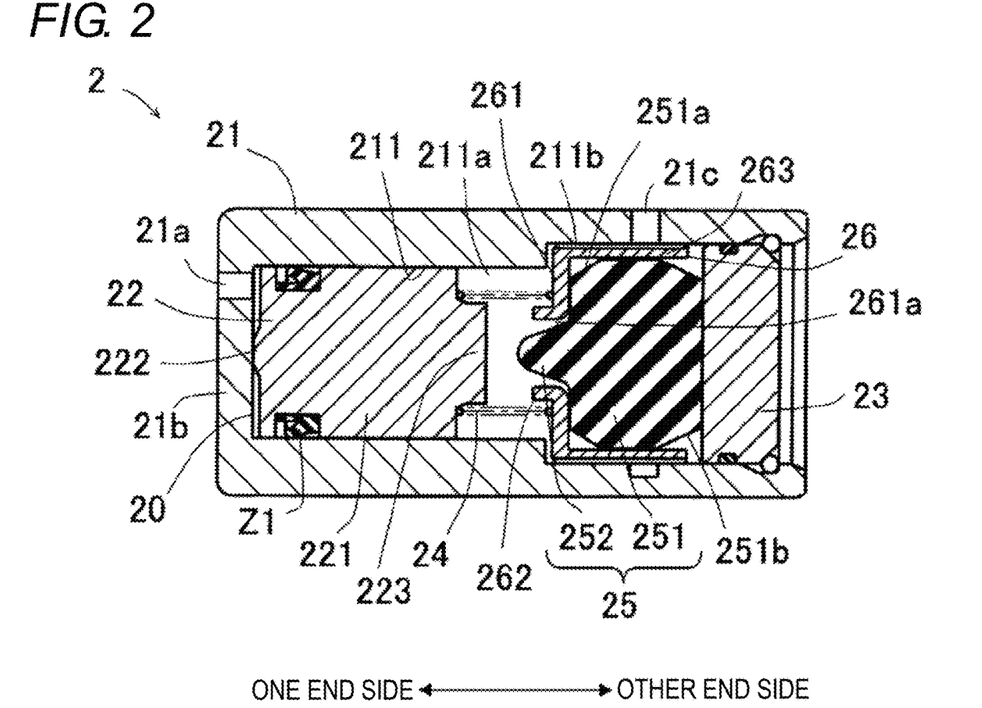
FIG. 2 is a schematic cross-sectional view of a stroke simulator according to the first embodiment.

As shown in FIG. 2, the stroke simulator 2 includes a cylinder 21, a piston 22, a lid member 23, a first elastic member 24, a second elastic member 25, and a retainer 26. In the description, the axial direction of the piston 22 is referred to as "axial direction", one end in the axial direction is simply referred to as "one end", and the other end in the axial direction is simply referred to as "other end".

The cylinder 21 is a tubular metal member formed with a cylinder hole 211 connected at one end side to a pipe (corresponding to "flow path") 164 connected to a pressurizing unit that generates fluid pressure in accordance with the operation of the brake pedal 10. That is, the cylinder 21 defines the cylinder hole 211 connected to the pipe 164. The pressurizing unit is a portion that pressurizes the cylinder hole 211 in accordance with a brake operation, and is, for example, the brake pedal 10, the input piston 13, and/or the first fluid pressure chamber 1B. The pressurizing unit can also be said to be a portion that supplies the brake fluid to the pipe 164 according to the brake operation. At one end of the cylinder 21 (here, the bottom wall 21b), a port 21a that allows the pipe 164 to communicate with the cylinder hole 211 is formed. The cylinder hole 211 includes a first cylinder hole 211a located on one end side, and a second cylinder hole 211b located on the other end side of the first cylinder hole 211a and having a larger diameter than the first cylinder hole 211a. A step difference is formed in the cylinder hole 211 by the first cylinder hole 211a and the second cylinder hole 211b which are coaxially arranged. The cylinder 21 may be formed so as not to have the step difference (e.g., linearly). For example, the first cylinder hole 211a and the second cylinder hole 211b may have the same diameter.

The piston 22 is a circular column shaped metal member arranged in the first cylinder hole 211a of the cylinder hole 211. The piston 22 is disposed so as to be slidable in the axial direction with respect to the cylinder 21. The piston 22 includes a main body portion 221 provided with the seal member Z1, a first projecting portion 222 projecting out from one end face of the main body portion 221, and a second projecting portion 223 projecting out from the other end face of the main body portion 221. At an initial position where the brake pedal 10 is not operated, the first projecting portion 222 is abutted with the bottom wall 21b of the cylinder 21. Thus, the cylinder 21 and the piston 22 form the fluid pressure chamber 20 at one end of the cylinder hole 211. The fluid pressure chamber 20 can also be said to be a reaction force chamber for forming a reaction force pressure. The lid member 23 is a circular column shaped metal member that closes the opening at the other end side of the cylinder hole 211.

The elastic members, that is, the first elastic member 24 and the second elastic member 25 are arranged between the piston 22 and the lid member 23. The first elastic member 24 is a metal coil spring (spring) disposed on the piston 22 side of the cylinder hole 211. One end of the first elastic member 24 abuts against the piston 22, and the other end of the first elastic member 24 abuts against the retainer 26. The second elastic member 25 is a rubber member disposed on the lid member 23 side of the cylinder hole 211. Thus, the piston 22 and the first elastic member 24 are arranged in the first cylinder hole 211a, and the second elastic member 25 is arranged in the second cylinder hole 211b.

The second elastic member 25 is an integrally molded product made of rubber, and includes a base portion 251 arranged in series with the first elastic member 24, and a protruding portion 252 protruding out from an end face of the base portion 251 on the piston 22 side. The second elastic member 25 is configured such that the base portion 251 compresses and deforms after the protruding portion 252 abuts against the piston 22 (here, the second projecting portion 223) and is compressed and deformed when the piston 22 moves in the axial direction toward the lid member 23 side. The piston 22 moves based on the pressing force by the fluid pressure of the fluid pressure chamber 20.

The base portion 251 is formed in a circular column shape. At one end of the base portion 251 (one end in the axial direction), a first tapered portion 251a having a diameter that gradually reduces toward one end is formed, and at the other end of the base portion 251 (the other end in the axial direction), a second tapered portion 251b having a diameter that gradually reduces toward the other end is formed. One end face of the base portion 251 abuts against the retainer 26, and the other end face of the base portion 251 abuts against the lid member 23. The base portion 251 is arranged in series with the first elastic member 24. The protruding portion 252 is formed in a convex arc shape (dome shape) having a smaller diameter toward one end side, and projects out from a central portion of one end face of the base portion 251. One part of the protruding portion 252 is arranged in parallel with the first elastic member 24. At the initial position, the second elastic member 25 and the piston 22 are separated.

Figure 3:
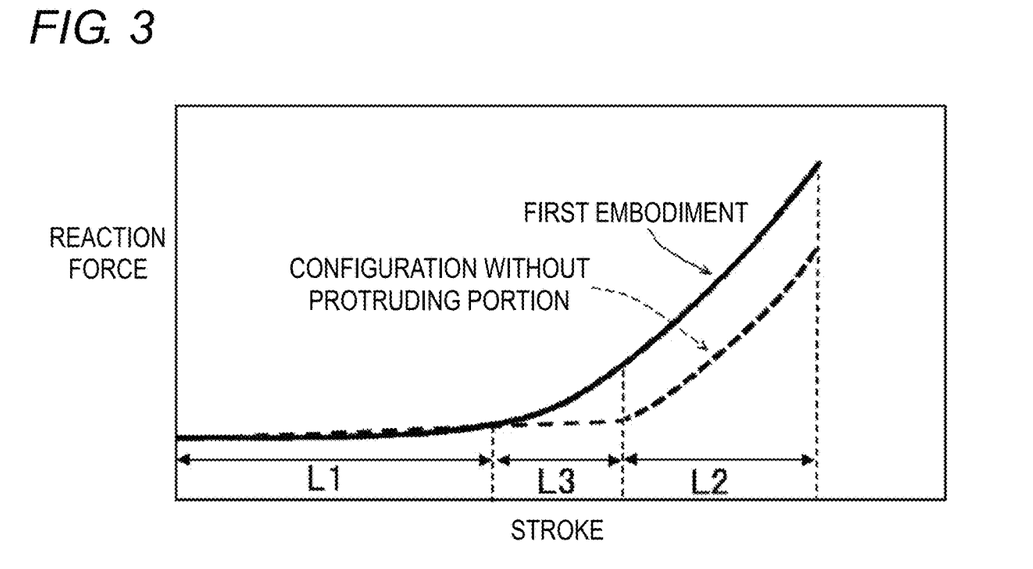
FIG. 3 is an explanatory view showing a reaction force characteristic of the first embodiment.

In the first embodiment, the first elastic member 24 has a first elastic coefficient, the base portion 251 has a second elastic coefficient, and the protruding portion 252 has a third elastic coefficient. The second elastic coefficient is larger than the first elastic coefficient. The third elastic coefficient takes a value in a range smaller than the second elastic coefficient. As shown in FIG. 3, the compressive deformation of the protruding portion 252 is carried out in a third stroke section L3 connecting a first stroke section L1 in which a reaction force is generated by the first elastic coefficient and a second stroke section L2 in which a reaction force is generated by the second elastic coefficient in a reaction force characteristic that is a relationship between the reaction force and the stroke. In the first embodiment, the first elastic coefficient shows a linear reaction force characteristic, and the second and third elastic coefficients show a non-linear reaction force characteristic. The base portion 251 creates a non-linear reaction force characteristic by taking a variable value that gradually increases with the progress of compressive deformation as the second elastic coefficient. Similarly, the protruding portion 252 creates a non-linear reaction force characteristic by taking a variable value that gradually increases with the progress of compressive deformation as the third elastic coefficient.

The retainer 26 is a cylindrical metal member provided between the first elastic member 24 and the base portion 251 of the second elastic member 25. Specifically, the retainer 26 includes a plate-shaped portion 261, a projecting portion 262, and a cylindrical portion 263. The plate-shaped portion 261 is a disc-shaped portion that has a hole 261a formed at a position corresponding to the protruding portion 252 and that is arranged to face the end face of the base portion 251 on the piston 22 side. In other words, the plate-shaped portion 261 is a circular ring portion arranged to face the end face of the base portion 251 on the piston 22 side other than the protruding portion 252. The first elastic member 24 abuts against one end face of the plate-shaped portion 261, and the base portion 251 abuts against the other end face of the plate-shaped portion 261.

The projecting portion 262 is a cylindrical portion projecting out toward the piston 22 side (one end side) from the periphery (also referred to as portion forming the inner peripheral portion and the hole 261a of the plate-shaped portion 261) of the hole 261a of the plate-shaped portion 261 so as to surround the basal end portion (other end portion) of the protruding portion 252. One end face (distal end face) of the projecting portion 262 is located on the other end side of one end (distal end) of the protruding portion 252. In other words, the protruding portion 252 projects out more toward the piston 22 side than the projecting portion 262.

The cylindrical portion 263 is a cylindrical member projecting out from the outer peripheral portion of the plate-shaped portion 261 toward the lid member 23 side (other end side). The cylindrical portion 263 is provided between the outer peripheral surface of the base portion 251 and the inner peripheral surface of the cylinder 21. The other end of the cylindrical portion 263 is separated from the lid member 23 at the initial position. A slight gap is formed between the outer peripheral surface of the retainer 26 (including one end face of the plate-shaped portion 261) and the inner peripheral surface of the cylinder 21 (including the step difference surface between the first cylinder hole 211a and the second cylinder hole 211b). The second cylinder hole 211b and the reservoir 200 communicate with each other through the gap and the flow path 21c formed in the cylinder 21. The reservoir 200 is not exclusively used for the stroke simulator, and may be shared with another reservoir (e.g., reservoir 172 etc.).

Figure 4:
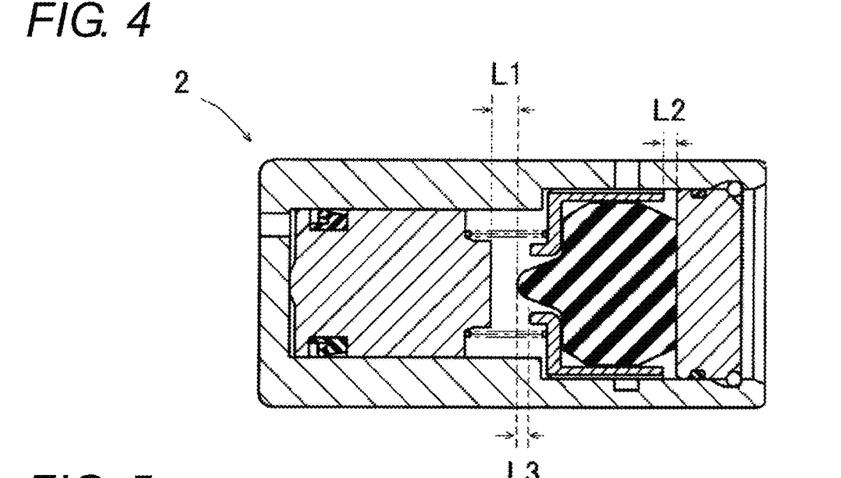
FIG. 4 is a schematic cross-sectional view of the stroke simulator according to the first embodiment.

As shown in FIG. 4, the separation distance (axial interval) between one end face of the projecting portion 262 and the other end face of the piston 22 (second projecting portion 223) corresponds to the size of the stroke in the first stroke section L1. Furthermore, the separation distance between one end of the protruding portion 252 and one end face of the projecting portion 262 corresponds to the size of the stroke in the third stroke section L3. Moreover, the separation distance between the other end face of the cylindrical portion 263 and the one end face of the lid member 23 corresponds to the size of the stroke in the second stroke section L2.

According to the first embodiment, when the brake pedal 10 is operated, the brake fluid is supplied from the first fluid pressure chamber 1B to the stroke simulator 2 through the pipe 164. The brake fluid flows into the fluid pressure chamber 20 (pressurizes the fluid pressure chamber 20) and presses the piston 22 toward the other end side to move forward (move in the axial direction). From the magnitude relationship of the elastic coefficients, the first elastic member 24 is first compressed and deformed with respect to the forward movement of the piston 22. Thus, a linear reaction force characteristic is realized at the initial stage of the brake operation (first stroke section L1).

Furthermore, when the piston 22 moves forward and the piston 22 abuts against the protruding portion 252, a non-linear reaction force characteristic due to the third elastic coefficient is realized with respect to the subsequent forward movement of the piston 22. That is, in the intermediate stage of the brake operation (third stroke section L3), a non-linear reaction force characteristic is realized by the compressive deformation of the protruding portion 252. As shown in FIG. 3, in the third stroke section L3, the non-linear reaction force by the protruding portion 252 is accumulated with respect to the linear reaction force by the first elastic member 24, as compared with the configuration without the protruding portion 252. Then, when the piston 22 moves forward and abuts against the projecting portion 262, the retainer 26 moves forward with the piston 22 with respect to the subsequent forward movement of the piston 22 thus compressing and deforming the base portion 251. That is, in the final stage of the brake operation (second stroke section L2), a non-linear reaction force characteristic is realized by the compressive deformation of the base portion 251.

As described above, according to the first embodiment, the two elastic members, the first elastic member 24 and the second elastic member 25, can realize a brake feeling in which a sense of discomfort is reduced. That is, according to the first embodiment, the number of components can be reduced without impairing the brake feeling.

Furthermore, according to the first embodiment, for example, a rod member and a spring seat member can be omitted as compared with the conventional configuration, and the configuration can be simplified. Moreover, according to the first embodiment, for example, a caulking process of a rod member to a hat and a spring surface treatment process become unnecessary, and the number of man-hours and processing costs can be reduced. Furthermore, according to the first embodiment, as the number of components is reduced, assembling becomes easier. Moreover, according to the first embodiment, the function of the two elastic members is exhibited by one elastic member (second elastic member 25), and hence the axial dimension of the stroke simulator 2 can be reduced, and miniaturization becomes possible. In addition, since a rubber member is used as the elastic member (second elastic member 25) in the high pedaling force region, the weight can be reduced as compared with the conventional technology that uses a metal spring having a large elastic coefficient. Note that the piston 22 may be made of an aluminum alloy.

The arrangement of the retainer 26 facilitates the setting of each of the stroke sections L1 to L3 such as the maximum amount of deformation of the protruding portion 252. Furthermore, since the pressing force of the piston 22 in the second stroke section L2 is dispersed through the retainer 26 and is applied to the second elastic member 25, for example, settling of the protruding portion 252 is suppressed, and durability of the second elastic member 25 is improved.

Furthermore, tapered portions 251a and 251b are formed at both ends of the base portion 251. With this configuration, a space is formed on the outer peripheral side of both ends of the base portion 251. The base portion 251 can escape (expand) into the space at the time of compressive deformation, and can smoothly compress and deform in the axial direction. The tapered portion may be formed only at one end in the axial direction of the base portion 251.

Second Embodiment

Figure 5:
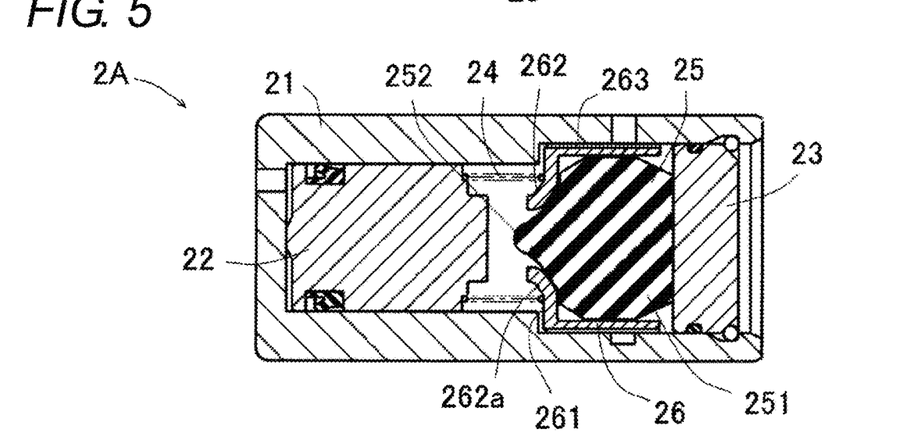
FIG. 5 is a schematic cross-sectional view of a stroke simulator according to a second embodiment.

A stroke simulator 2A of the second embodiment differs from the first embodiment in the configuration of the retainer. Therefore, only the different portions will be described based on the description of the first embodiment and the drawings. As shown in FIG. 5, the projecting portion 262 of the retainer 26 of the second embodiment includes a high-rigidity portion 262a having a diameter that gradually reduces toward the piston 22. In other words, the projecting portion 262 projects out toward one end side from the inner peripheral portion (portion where the hole 261a is formed) of the plate-shaped portion 261 so that the diameter gradually reduces toward one end. The high-rigidity portion 262a has a tapered outer peripheral surface, and has relatively high rigidity. The rigidity is the difficulty in deforming with respect to the received force, that is, a force necessary to deform the unit deformation amount. The surface of the base portion 251 on the retainer 26 side (also referred to as the side surface of the basal end portion of the protruding portion 252) is formed along the high-rigidity portion 262a. The second elastic member 25 of the second embodiment is formed in a shape that matches the shape of the high-rigidity portion 262a, and is disposed on the inner side of the retainer 26 so as to abut against the high-rigidity portion 262a. According to the second embodiment as well, effects similar to those of the first embodiment are exhibited. Furthermore, according to the second embodiment, the presence of the high-rigidity portion 262a makes it difficult for the retainer 26 to be deformed with respect to the forward movement of the piston 22, thus improving durability.

Third Embodiment

Figure 6:
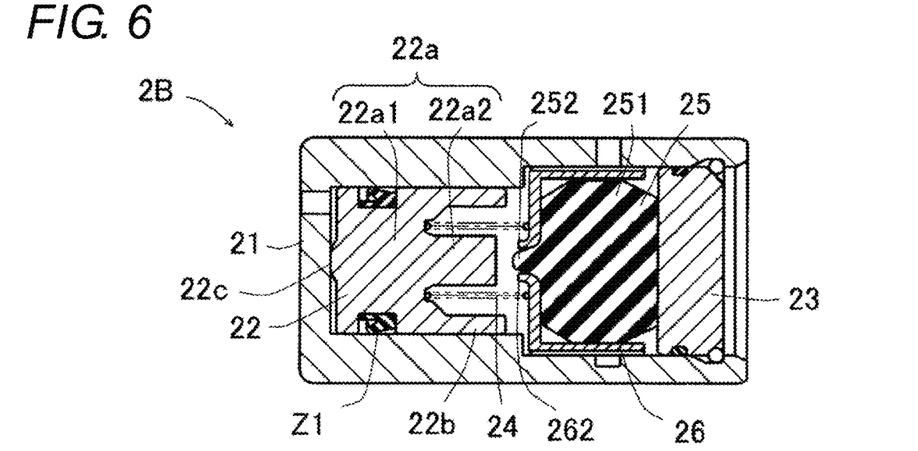
FIG. 6 is a schematic cross-sectional view of a stroke simulator according to a third embodiment.

A stroke simulator 2B of the third embodiment differs from the first embodiment mainly in the configuration of the piston. Therefore, only the different portions will be described based on the description of the first embodiment and the drawings. As shown in FIG. 6, the piston 22 of the third embodiment is a bottomed cylindrical member having a bottom surface at one end side and an opening at the other end side. Specifically, the piston 22 includes a main body portion 22a, a cylindrical abutment portion 22b projecting out from the outer peripheral portion of the main body portion 22a toward the other end side (lid member 23 side), and a projecting portion 22c projecting out from one end face of the main body portion 22a.

The main body portion 22a corresponds to the main body portion 221 of the first embodiment, and includes a larger-diameter part 22a1 provided with the seal member Z1, and a smaller-diameter part 22a2 smaller in diameter than the larger-diameter part 22a1. The smaller-diameter part 22a2 projects out from the larger-diameter part 22a1 toward the lid member 23 so as to face the protruding portion 252. The first elastic member 24 is abutted against the larger-diameter part 22a1 of the main body portion 22a on the outer peripheral side of the smaller-diameter part 22a2. It can be said that a part of the larger-diameter part 22a1 and the smaller-diameter part 22a2 form the bottom portion of the piston 22. The abutment portion 22b is located on the outer peripheral side of the first elastic member 24, and projects out from the outer peripheral portion of the larger-diameter part 22a1 toward the other end side. The other end (end on the lid member 23 side) of the abutment portion 22b is located on the other end side than the other end of the smaller-diameter part 22a2. The projecting portion 22c corresponds to the first projecting portion 222 of the first embodiment.

In the third embodiment, when the brake operation is performed and the fluid pressure chamber 20 becomes high pressure, and the piston 22 moves forward by a predetermined stroke (corresponding to the first stroke section L1) while compressing and deforming the first elastic member 24, the smaller-diameter part 22a2 and the protruding portion 252 abut against each other. Furthermore, when the piston 22 moves forward by a predetermined stroke (corresponding to the third stroke section L3) while compressing and deforming the protruding portion 252, the abutment portion 22b of the piston 22 and the plate-shaped portion 261 of the retainer 26 abut against each other before the smaller-diameter part 22a2 and the projecting portion 262 of the retainer 26 abut to each other (or at the same time as the abutment). That is, when the abutment portion 22b and the retainer 26 abut to each other, the smaller-diameter part 22a2 and the projecting portion 262 are separated (or abutted simultaneously).

Furthermore, when the piston 22 moves forward by a predetermined stroke (corresponding to the second stroke section L2) while compressing and deforming the base portion 251, the cylindrical portion 263 of the retainer 26 abuts against the lid member 23. As described above, the second elastic member 25 is configured such that the protruding portion 252 abuts against the main body portion 22a (smaller-diameter part 22a2) and is compressed and deformed, and then the base portion 251 is compressed and deformed at least by the pressing force from the abutment portion 22b when the piston 22 is moved in the axial direction toward the lid member 23 side.

According to the third embodiment as well, effects similar to those of the first embodiment are exhibited. Furthermore, according to the third embodiment, the abutment portion 22b located on the outer peripheral portion of the piston 22 abuts against the retainer 26 and presses the base portion 251 with the forward movement of the piston 22. Therefore, for example, in the second stroke section L2, the piston 22 moves on the axis more stably, and the occurrence of the torsion of the piston 22 is suppressed. Furthermore, the first elastic member 24 can be arranged on the inner side of the piston 22 (larger-diameter part 22a1), and the axial length of the stroke simulator 2 can be reduced. That is, miniaturization becomes possible. Moreover, since the piston 22 has a bottomed cylindrical shape, the weight can be reduced.

Fourth Embodiment

Figure 7:
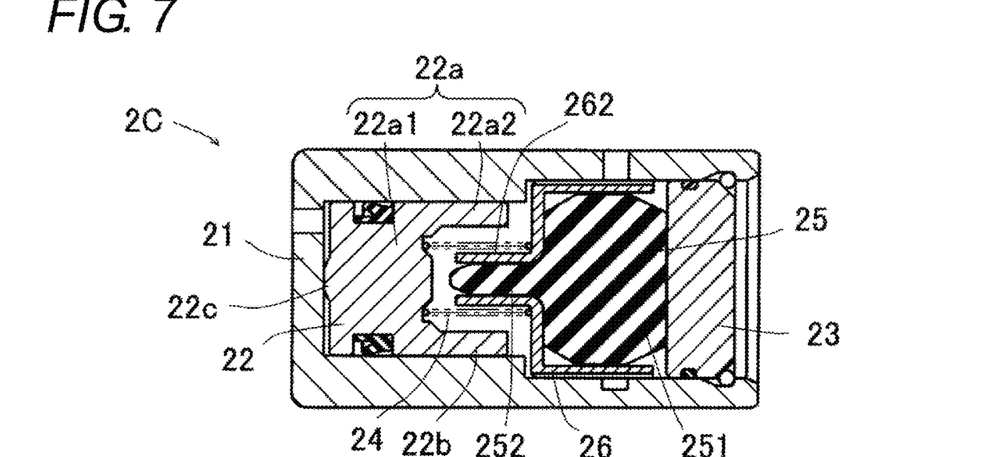
FIG. 7 is a schematic cross-sectional view of a stroke simulator according to a fourth embodiment.

A stroke simulator 2C of the fourth embodiment differs from the third embodiment mainly in the configuration of the smaller-diameter part 22a2, the protruding portion 252, and the projecting portion 262. Therefore, only the different portions will be described based on the description of the third embodiment and the drawings. As shown in FIG. 7, the smaller-diameter part 22a2 of the fourth embodiment is configured such that the projection amount is smaller than that of the third embodiment, and the distal end (other end) is located at the central portion of the piston 22. As in the third embodiment, the first elastic member 24 is arranged on the outer peripheral side of the smaller-diameter part 22a2, and the smaller-diameter part 22a2 has a function of positioning the first elastic member 24. The distal ends (one ends) of the protruding portion 252 and the projecting portion 262 have a larger projection amount than in the third embodiment, and are located on the inner side of the abutment portion 22b at the initial position. The separation distance between the smaller-diameter part 22a2 and the protruding portion 252 corresponds to the first stroke section L1.

According to the fourth embodiment as well, effects similar to those of the third embodiment are exhibited. Furthermore, according to the fourth embodiment, in the third stroke section L3, the main body portion 22a (smaller-diameter part 22a2) and the protruding portion 252 abut against each other near the center of the piston 22, so that the torsion of the piston 22 pressing the protruding portion 252 is further suppressed. Moreover, since the smaller-diameter part 22a2 is short (e.g., the piston 22 may be formed in a concave shape), the manufacturing becomes easier than in the third embodiment. The smaller-diameter part 22a2 may have a planar shape (projection amount=0) that coincides with the end face of the larger-diameter part 22a1.

Fifth Embodiment

Figure 8:
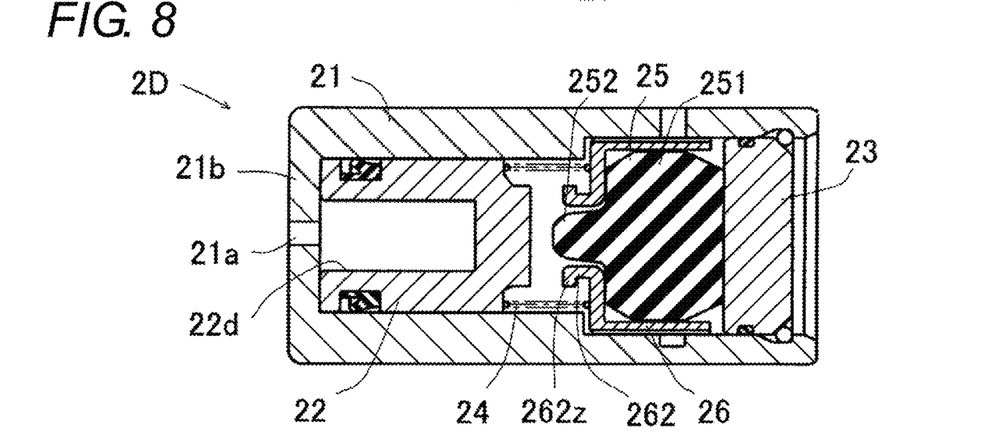
FIG. 8 is a schematic cross-sectional view of a stroke simulator according to a fifth embodiment.

A stroke simulator 2D of the fifth embodiment differs from the first embodiment mainly in the configuration of the piston 22 and the projecting portion 262. Therefore, only the different portions will be described based on the description of the first embodiment and the drawings. As shown in FIG. 8, the piston 22 of the fifth embodiment is a bottomed cylindrical member having an opening at one end side and a bottom surface at the other end side. That is, the piston 22 includes a concave portion 22d opened at one end. An open end (one end) of the piston 22 is abutted against the bottom wall 21b of the cylinder 21 at the initial position. The port 21a is formed to face the opening of the piston 22. According to this configuration, the fluid pressure chamber 20 is formed by the concave portion 22d and the cylinder 21 without providing the first projecting portion 222 as in the first embodiment in the piston 22. Furthermore, according to this configuration, the weight of the piston 22 can be reduced, and the weight of the stroke simulator 2 can also be reduced.

Figure 9:
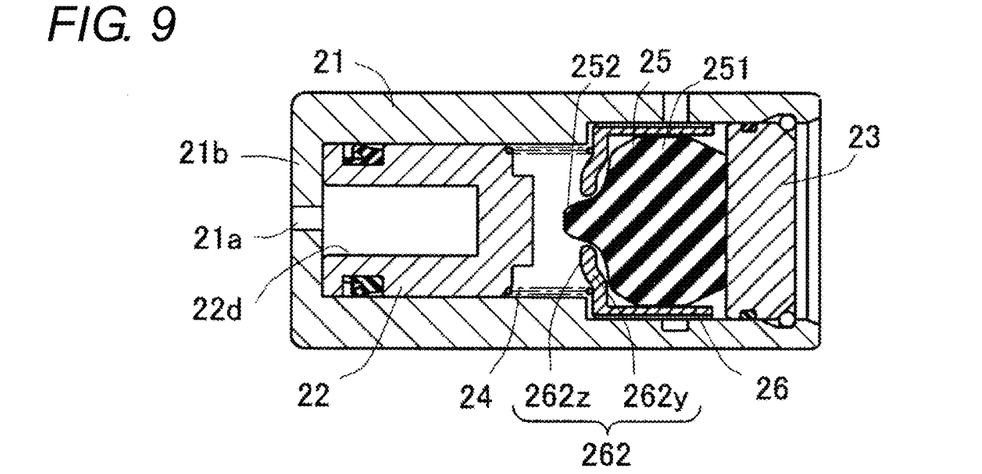
FIG. 9 is a schematic cross-sectional view of a modified example of the stroke simulator according to the fifth embodiment.

In the fifth embodiment, the distal end portion (one end) of the projecting portion 262 is a thick portion 262z that extends radially outward from the basal end portion. Thus, the rigidity of the distal end portion of the projecting portion 262 becomes relatively high, and the durability is improved. According to the fifth embodiment as well, effects similar to those of the first embodiment are exhibited. Moreover, as shown in FIG. 9, the projecting portion 262 may include a high-rigidity portion 262y having a diameter that gradually reduces toward one end, and a thick portion 262z located at the distal end and expanding radially inward. This also improves durability.

Sixth Embodiment

Figure 10:
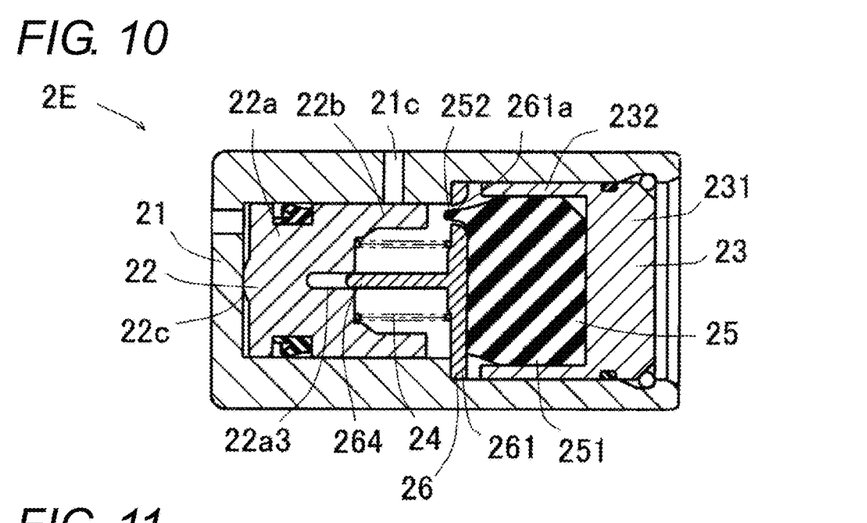
FIG. 10 is a schematic cross-sectional view of a stroke simulator according to a sixth embodiment.
Figure 11:
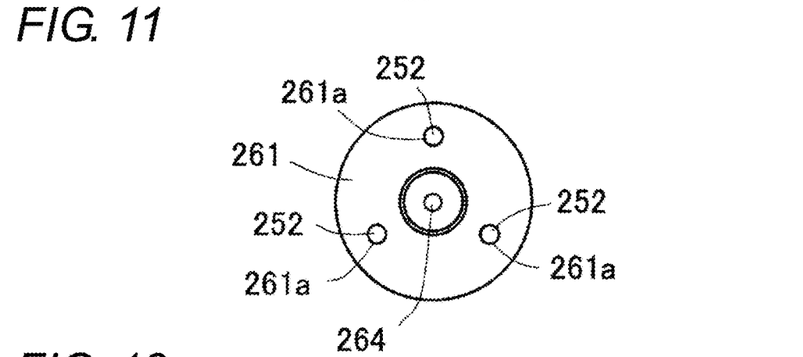
FIG. 11 is a view of a retainer according to the sixth embodiment as viewed from one end side.

A stroke simulator 2E of the sixth embodiment differs from the first embodiment mainly in the configuration of the piston 22, the lid member 23, the protruding portion 252, and the retainer 26. Therefore, only the different portions will be described based on the description of the first embodiment and the drawings. As shown in FIG. 10, the retainer 26 of the sixth embodiment includes a plate-shaped portion 261 that has a hole 261a formed at a position corresponding to the protruding portion 252 and is disposed to face the end face of the base portion 251 on the piston 22 side, and a circular column shaped guide portion 264 projecting out from the center of the plate-shaped portion 261 toward the piston 22 side. As shown in FIG. 11, a plurality of protruding portions 252 (here, three) are provided at one end face of the base portion 251 at intervals (here, equal intervals) in the peripheral direction. Furthermore, the plate-shaped portion 261 is provided with a plurality of holes 261a (here, three holes) corresponding to the plurality of protruding portions 252.

The lid member 23 includes a closing portion 231 that closes the opening of the cylinder 21 and a holding portion 232 that projects out from the closing portion 231 toward the piston 22 side while abutting against the inner peripheral surface of the cylinder 21. The holding portion 232 is formed in a cylindrical shape. At the initial position, the plate-shaped portion 261 and the holding portion 232 are separated from each other by the second stroke section L2 and are arranged to face each other.

The piston 22 is a bottomed cylindrical member having a main body portion 22a and a cylindrical abutment portion 22b projecting out from the main body portion 22a toward the lid member 23 side. A concave portion 22a3 into which the guide portion 264 of the retainer 26 is movably inserted in the axial direction is formed in the main body portion 22a. The distal end of the guide portion 264 is arranged in the concave portion 22a3 at the initial position. The abutment portion 22b is formed so as to face the three protruding portions 252 with an interval corresponding to the first stroke section. The first elastic member 24 is in contact with the main body portion 22a and the plate-shaped portion 261.

The second elastic member 25 is configured such that the base portion 251 compresses and deforms after the protruding portion 252 abuts against the abutment portion 22b and is compressed and deformed when the piston 22 moves in the axial direction toward the lid member 23 side. With the forward movement of the piston 22, the abutment portion 22b compresses and deforms the protruding portion 252, and then (after moving the third stroke section L3) abuts against the plate-shaped portion 261 to press the base portion 251 through the plate-shaped portion 261. The plate-shaped portion 261 moves forward together with the abutment portion 22b, and compresses and deforms the base portion 251 to abut against the holding portion 232. The flow path 21c for communicating the inside and the outside of the cylinder 21 is provided on the first cylinder hole 211a side of the cylinder 21.

According to the sixth embodiment as well, effects similar to those of the first embodiment are exhibited. Furthermore, according to the sixth embodiment, the guide portion 264 suppresses the torsion of the piston 22. Moreover, since the plurality of protruding portions 252 are arranged at equal intervals in the peripheral direction at portions other than the central portion of the plate-shaped portion 261, the piston 22 can apply a force more stably to the second elastic member 25. In addition, since the piston 22 is formed in a bottomed cylindrical shape opened at the other end side, the axial length of the stroke simulator 2 can be reduced, and miniaturization becomes possible.

<Others>

Figure 12:
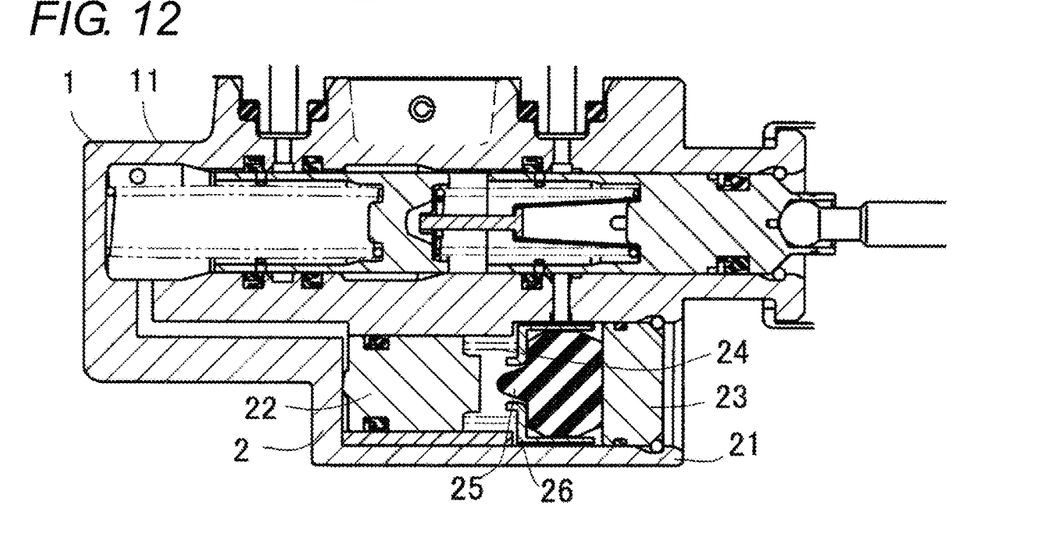
FIG. 12 is a schematic cross-sectional view of a modified example of the stroke simulator of the embodiment.

The present invention is not limited to the embodiments described above. For example, the retainer 26 need not be provided. In this case, the first elastic member 24 abuts against the base portion 251 and the other end of the piston 22 (second projecting portion 223 or the abutment portion 22b) presses the base portion 251 through the protruding portion 252 or directly. This also allows the number of components to be reduced without impairing the brake feeling. Furthermore, as shown in FIG. 12, the cylinder 21 may be an integrally molded product with the master cylinder 1 (main cylinder 11). This makes it possible to reduce the size of the entire vehicle braking device BF and reduce the number of components. The configuration of FIG. 12 can be applied to any of the configurations of the first to sixth embodiments. Furthermore, in the example of FIG. 12, the reservoir 200 is eliminated and the reservoir 172 of the master cylinder 1 is used as the reservoir of the stroke simulator 2.

Furthermore, a slit extending in the axial direction, for example, may be formed in the base portion 251 as the escape portion instead of the tapered portions 251a and 251b. Furthermore, the tapered portions 251a and 251b may not be provided. Moreover, the projecting portion 262 may include at least one of the high-rigidity portions 262a and 262y having a diameter that gradually reduces toward the piston 22 and the thick portion 262z having a thicker radial thickness than other portions. The description of the first embodiment and the drawings can be referred to in the description of the second to sixth embodiments. Furthermore, the features of each embodiment can be combined with each other as much as possible. In addition, the "bottomed cylindrical" or "cylindrical" portion in the present embodiment merely needs to be a "bottomed tubular" or "tubular" portion, and for example, the outer shape of the cross-section is not limited to a circular shape, and for example, may be a rectangular shape or a shape having a curve and a straight line. Note that, in the drawings (schematic cross-sectional views), lines that are visible behind the cross section are omitted.

The invention claimed is:

1. A stroke simulator for applying a reaction force to a brake operation member, the stroke simulator comprising:
    a tubular cylinder formed with a cylinder hole connected at one end side to a flow path connected to a pressurizing unit that generates fluid pressure in accordance with an operation of the brake operation member;
    a piston disposed in the cylinder hole;
    a lid member that closes an opening on the other end side of the cylinder hole; and
    an elastic member disposed between the piston and the lid member, wherein
    the elastic member includes a first elastic member disposed on the piston side of the cylinder hole, and a second elastic member disposed on the lid member side of the cylinder hole,
    the cylinder hole is formed with a first cylinder hole to which the piston and the first elastic member are disposed and that is formed on the flow path side, and is provided with the second elastic member and is formed on the lid member side,
    the second elastic member includes a base portion arranged in series with the first elastic member, and a protruding portion protruding out from an end face of the base portion on the piston side, and is configured such that, when the piston moves in an axial direction toward the lid member side, the base portion compresses and deforms after the protruding portion abuts against the piston and is compressed and deformed,
    the stroke simulator further comprises a retainer disposed between the first elastic member and the base portion of the second elastic member,
    the retainer includes a plate-shaped portion that has a hole formed at a position corresponding to the protruding portion and that is arranged to face an end face of the base portion on the piston side, and a guide portion projecting out from the plate-shaped portion toward the piston,
    the lid member includes a closing portion that closes the opening, and a holding portion that projects out from the closing portion toward the piston while abutting against an inner peripheral surface of the cylinder,
    the plate-shaped portion and the holding portion are separated from each other and arranged to face each other at an initial position where the brake operation member is not operated,
    the piston is a bottomed tubular member including a main body portion and an abutment portion projecting out from an outer peripheral portion of the main body portion toward the lid member side,
    a concave portion is formed in the main body portion so that the guide portion is movably inserted in the axial direction.

2. The stroke simulator according to claim 1, wherein
the first elastic member has a first elastic coefficient,
the base portion has a second elastic coefficient,
the protruding portion has a third elastic coefficient,
the second elastic coefficient is larger than the first elastic coefficient,
the third elastic coefficient takes a value in a range smaller than the second elastic coefficient, and
the compressive deformation of the protruding portion is performed in a third stroke section connecting a first stroke section in which a reaction force is generated by the first elastic coefficient and a second stroke section in which a reaction force is generated by the second elastic coefficient in a reaction force characteristic that is a relationship between a reaction force and a stroke.

3. The stroke simulator according to claim 2, wherein
at one end in an axial direction of the base portion, a first tapered portion having a diameter that gradually reduces toward one side in the axial direction is formed, and/or
at the other end in the axial direction of the base portion, a second tapered portion having a diameter that gradually reduces toward the other side in the axial direction is formed.

4. The stroke simulator according to claim 1, wherein
at one end in an axial direction of the base portion, a first tapered portion having a diameter that gradually reduces toward one side in the axial direction is formed, and/or
at the other end in the axial direction of the base portion, a second tapered portion having a diameter that gradually reduces toward the other side in the axial direction is formed.

5. The stroke simulator according to claim 1, wherein the cylinder is an integrally molded product with a master cylinder.

* * * * *